United States Patent [19]

Nebelung et al.

[11] 4,009,018
[45] Feb. 22, 1977

[54] GLASSWARE FORMING MACHINE OF THE I. S. TYPE WITH IN-LINE MOLD MOTION

[75] Inventors: Hermann Nebelung, Zurich; Edward Charles Christopher, Zollikon, both of Switzerland

[73] Assignee: Emhart Industries, Inc., Farmington, Conn.

[22] Filed: July 7, 1975

[21] Appl. No.: 593,752

[52] U.S. Cl. .................. 65/229; 65/237; 65/235; 65/241
[51] Int. Cl.² .................. C03B 9/00
[58] Field of Search .......... 65/229, 240, 232, 361, 65/237, 241, 235

[56] References Cited

UNITED STATES PATENTS

| | | | |
|---|---|---|---|
| 679,664 | 7/1901 | Blue | 65/361 X |
| 964,198 | 7/1910 | Barret | 65/235 |
| 1,626,703 | 5/1927 | Soubier | 65/235 X |
| 1,875,202 | 8/1932 | Aftergut | 65/235 X |
| 2,163,103 | 6/1939 | Pearson | 65/232 X |
| 3,251,673 | 5/1966 | Brymer, Jr. | 65/361 X |
| 3,338,699 | 8/1967 | Colchagoff et al. | 65/361 X |
| 3,434,820 | 3/1969 | Zappih et al. | 65/229 |
| 3,580,712 | 5/1971 | Mumford | 65/232 X |
| 3,591,358 | 7/1971 | Maul et al. | 65/232 X |
| 3,914,120 | 10/1975 | Foster | 65/361 X |

*Primary Examiner*—Robert L. Lindsay, Jr.
*Assistant Examiner*—Frank W. Miga
*Attorney, Agent, or Firm*—McCormick, Paulding & Huber

[57] ABSTRACT

An individual section of a Hartford I. S. type glassware forming machine is modified to provide for in-line, or parallel motion, of the split mold halves at both the blank and blow stations. Vertically extending rock shafts move the blank and blow mold holder structures on fixed ways, through toggle links similar to those in a conventional I. S. machine, but the space formerly occupied by the hinge pin at the blow side is made available for the mold structure because the ways are oriented parallel to and slightly below the neck ring hub mechanism. This design provides for an increased mold closing force at the blank side and simplifies the mold holder structure itself whereby the molds can be continually cooled from an internal chamber in the mold holder which is supplied with cooling air through a vertical interface between the movable mold holder structure and the fixed machine frame.

18 Claims, 14 Drawing Figures

GLASSWARE FORMING MACHINE OF THE I. S. TYPE WITH IN-LINE MOLD MOTION

BACKGROUND OF THE INVENTION

In a conventional Hartford I. S. type of glassware forming machine a plurality of independent, or individual sections, are operated in timed relationship to one another, and each such section receives gobs of molten glass from a feeder, the gobs being received at the blank side, or station, of each machine section usually in upwardly open blank or parison molds. Preliminary parisons are formed, usually in an inverted orientation in these blank molds, being subsequently swung over to the blow side for final forming in the blow molds. A neck ring mold cooperates with the blank mold at the blank side to form the parison, and moves with the parison to support it during transfer to the blow side of the section. Various components within each machine section act upon the parison at the blank and the blow stations, and all of these components including the neck ring transfer mechanism are operated under the control of a conventional timing device.

The reader is referred to any of the disclosures in the many patents issued on the timing features of a typical glassware forming machine of this type, and more particularly to the Ingle U.S. Pat. No. 1,911,119 for a more detailed discussion of these features of a conventional Hartford I. S. type glassware forming machine.

Both the blank and the blow molds each include two mating half sections which are mounted on mold holder arms in the conventional machine. The conventional arms are carried on a common hinge pin and are movable by a fluid motor through a suitable linkage under the control of the timing device. However, these pivotally mounted mold arms have disadvantages, some of which are related to the differences in degree of mold opening providing between a double or triple gob machine configuration. That is, the mold halves adjacent the hinge pin necessarily open less than do those more remote from the hinge pin. Simply increasing the angular travel of the pivotally mounted arms cannot be tolerated in an already overcrowded machine due to space limitations within each of the machine's several side-by-side sections.

Another disadvantage to the conventionally movable mold halves is related to the requirements for cooling the molds. Fixed cooling air towers are currently used so that the molds move through a continuous "wind" or air flow pattern in the conventional machine. This approach to cooling is not only wasteful, in terms of cost of cooling the machine, but is also quite noisy and difficult to achieve the desired temperature distribution at the forming surface of the mold.

SUMMARY OF THE INVENTION

Among the objects of the present invention are to eliminate the arcuate or pivotal mold motion about the vertical hinge pins at both the blank and the blow stations in order to provide more space in each individual machine section not only for the molds themselves but also for an improved mold cooling system. Eliminating the hinge pin, and its pivotally movable mold arms, also eliminates other shortcomings of the prior art such as limitations to the closing forces attainable, and the like.

Accordingly, these objects of the present invention are achieved in this disclosure by providing fixed horizontal guide rods, or ways, in place of the vertical hinge pins in a conventional Hartford I. S. type of glassware forming machine. More particularly, the mold halves of the present disclosure are provided on mold holder structures which are slidably mounted on these ways, and an internal chamber is defined in each mold structure, each such chamber having an inlet opening in continuous communication with a cooling air source located in the fixed frame of the machine section. The in-line mold motion of the present invention not only provides for more uniform cooling of all portions of all molds, especially in a double or triple gob configuration, but also permits the achievement of higher and more effective mold closing forces as a result of the direction for these forces being normal to the parting line of the mold halves.

A more specific advantage to the present invention can be related to the achievement of the foregoing aims, that is to providing in-line mold motion in a Hartford I. S. type of machine, with extensive use being made of existing components in carrying out the necessary modifications to such a machine section. For example, the same mold opening motors are used, and the conventional linkage for oscillating the lower ends of the vertical rock shafts are also employed. The toggle links for connecting the upper ends of these shafts to the mold holder structure while not identical to those in the conventional I. S. machine, are nevertheless quite similar in function in that they achieve equal but opposite displacement of the associated mold holder structures.

DETAILED DESCRIPTION

Prior to considering the drawings in detail it might be well to summarize briefly the operation of a typical Hartford I. S. type of glassware forming machine. In such a machine, molten glass gobs are delivered through fixed chutes to the various sections of such a machine. Typically six to eight such sections might be fed from a single molten glass gob feeder, which produces the gobs at the downstream end of a molten glass forehearth furnace. Each machine section comprises a self-contained unit which includes a blank mold station and a blow mold station. The molten glass gobs are formed into parisons at the blank station, and then transferred to the blow station by a neck ring mechanism which includes a neck mold. The neck mold normally mates with the blank mold at the blank station, and also serves to support the parison during transfer to the blow station.

Blank molds have been made either solid, or of the split type, both types being adapted to mate with the neck mold or with an intermediate mold. The neck mold is generally of the split type, and is usually annular in configuration with a central opening to receive a vertically reciprocable plunger. The plunger presses the gob upwardly into the inverted blank mold in the "press and blow" process, or the plunger may be associated with a thimble to permit the parison to be formed by a "blow and blow" process. This latter process provides for counter-blow air at the blank station in addition to the final blow air at the blow station.

The glass gobs are formed at a rate determined by the machine operator, and these gobs are fed through a distribution system to the various blank mold cavities in each of the machine sections. Each blank cavity is upwardly open and a funnel is provided to move in onto the closed blank mold for guiding the gob into such cavity. The gobs, two in number in a double gob machine, drop through the funnels, into the cavity, and into the neck mold, which neck mold is always closed except for a short time at the blow station for release of the parison. In the process of forming the parison at the blank station the gob is settled into the neck mold to form the finish portion of the glassware article. This is accomplished in the usual "blow and blow" process by bringing a baffle downward onto the funnel, and providing air to the baffle for settling the charge in the blank mold. If no funnel is used in loading the gob, the baffle may move directly in on top of the blank mold. The plunger then moves downwardly away from the neck of the parison allowing the heat of the glass to stabilize in this part of the parison. This softens the inside glass surface by internal conduction, at least in the area where the plunger tip has caused it to cool during the preceding step. If counter-blow air is utilized, it will further soften this area of the parison. Whether counter-blow air is used or whether a plunger is raised upwardly into the parison in the "press and blow" process the gob will be expanded to fill the upper regions of the blank cavity defined by the blank mold and by the baffle. Once the parison has been so formed the split blank mold is ready for opening. The blank mold itself, and the means for opening the same, will be described in greater detail hereinafter.

With the blank mold opened, the parison is not in contact with any mold parts, except for the neck mold. Thus, heat is stored in the relatively thick walled parison, and will tend to raise the temperature of its surfaces. The neck mold comprises two annular segments mounted on each of two neck ring arms, which arms swing about a horizontal axis intermediate the blank and blow stations such that the "up side down" parison is rotated as it is moved out of the blank side, and assumes an upright position at the blow side of the machine. The blow mold closes around the parison, and around the bottom plate which is spaced below that end of the parison opposite its neck or open end. The blow mold usually has an upper edge portion which supports the parison from just below its finish, allowing the neck mold to be opened prior to revert or return movement of the neck ring mold back to the blank side. The neck ring mold recloses during return movement so that the blank mold can again close around it once the neck mold has returned to the blank side.

The parison is blown at the blow side of the machine, but the finish portion of the ware will have been formed by the neck mold and will not change shape. Final blow air is delivered to the interior of the parison through a blow head which moves down onto the top of the closed blow mold. The blow mold then opens and take out tongs, in an open configuration are swung into the blow station where the tongs close around the newly formed ware and the article is lifted off the bottom plate for delivery to a take away conveyor system, or the like.

Figure 1:
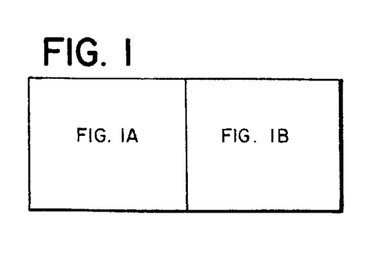
FIG. 1 is a composite over-view of FIGS. 1A and 1B, and shows in plan view the blank and blow sides, respectively, of a Hartford I. S. type machine section modified in accordance with the present invention.
Figure 1A:
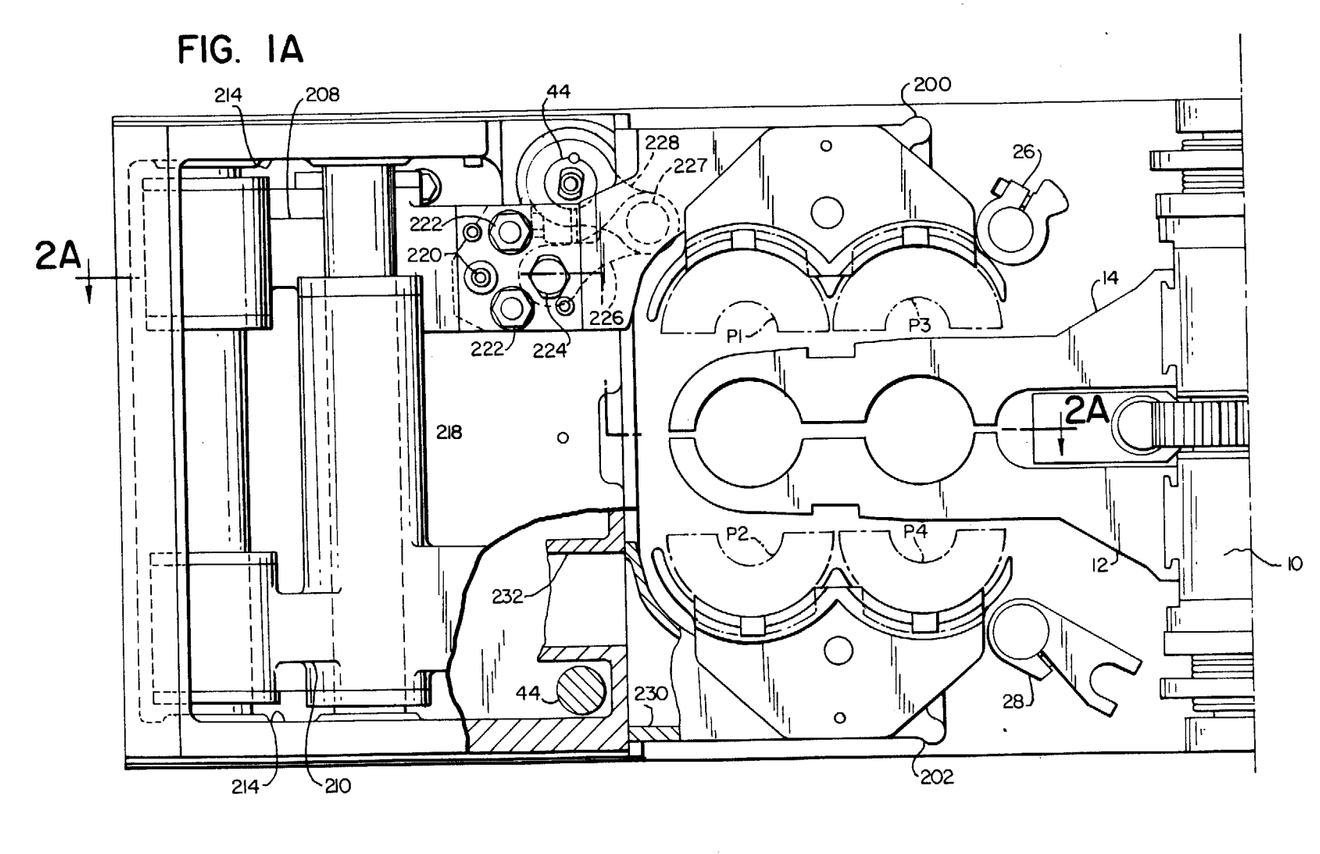
Figure 1B:
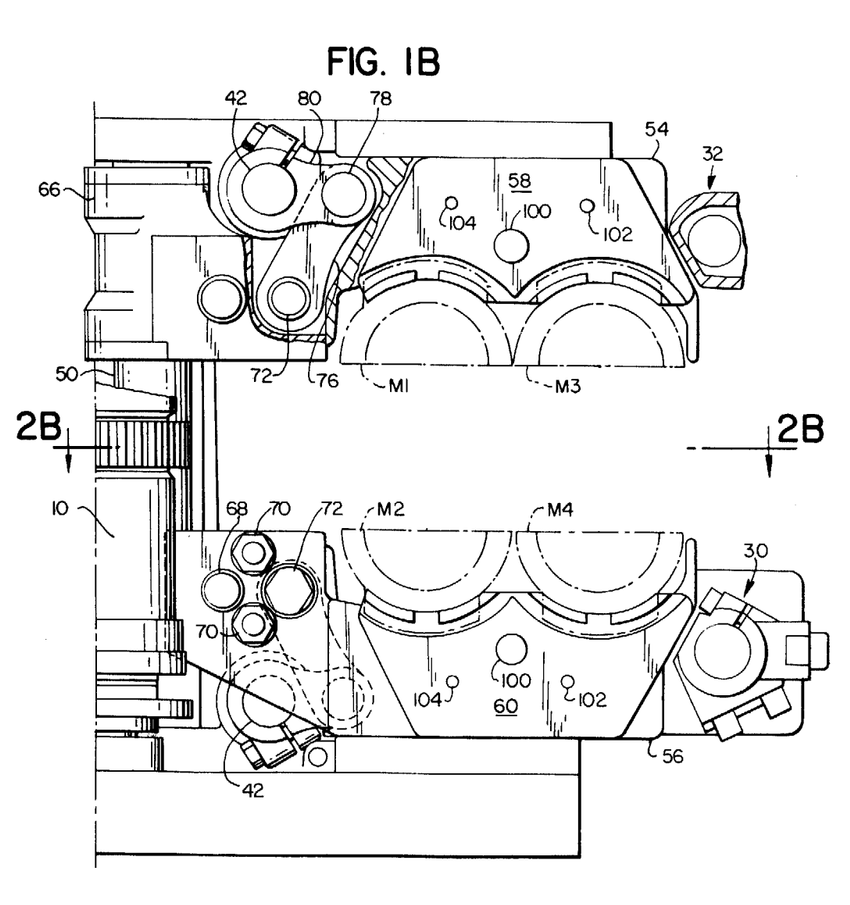

Turning now to the drawings in greater detail, FIG. 1 shows in composite plan view the blank and blow stations of a machine section modified in accordance with the present invention, FIG. 1A illustrating the blank side of the section, and FIG. 1B the blow side thereof. Both views illustrate the neck ring hub mechanism 10 which mechanism may be identical to that shown and described in prior art patents such as the Ingle U.S. Pat. No. 1,911,119 mentioned previously. In a typical neck ring mechanism means is provided for axially moving a pair of neck ring arms, 12 and 14, which arms support the segments or halves of a conventional neck ring mold and guide rings such as illusted at the lower portion of FIG. 3. The neck ring mold segments are illustrated at 16 in FIG. 3 and the guide ring at 18. The neck ring arms 12 and 14 are also shown in this view, but not shown is the plunger mechanism for projecting a plunger (not shown) upwardly through the neck ring opening 20. Still with reference to FIG. 3 it will be apparent that a gob of molten glass can be dropped downwardly into the upwardly open blank mold 22 so that the gob is stopped by the upper end of the plunger (not shown) the gob being ultimately pressed into parison shape after the upper open end of the blank mold has been closed by the baffle (not shown).

Figure 5:
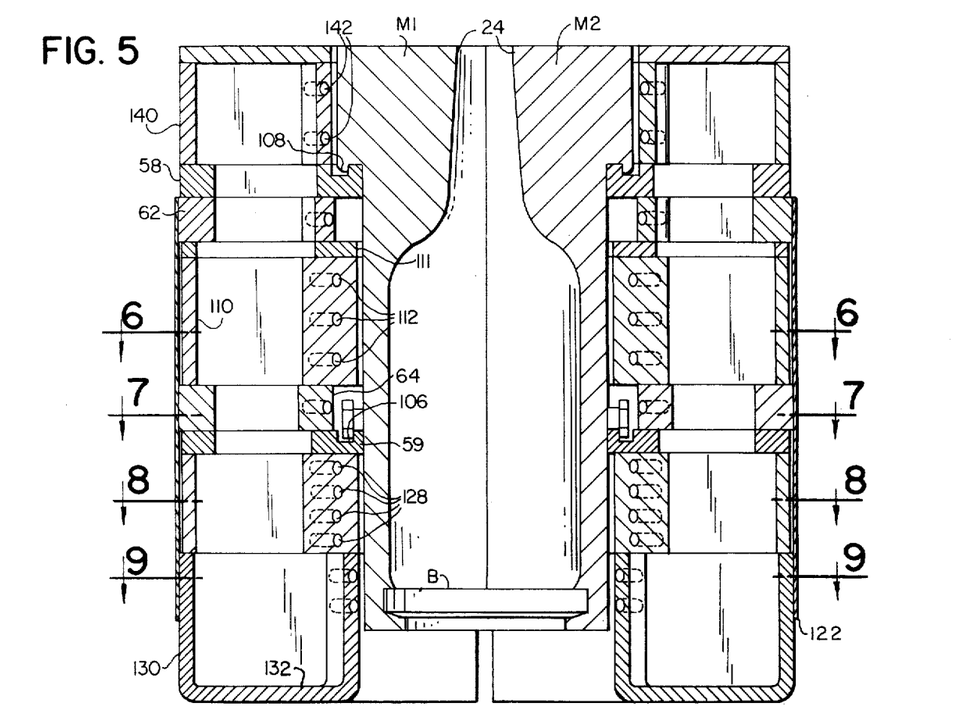
FIG. 5 is a vertical sectional view taken generally on the line 5—5 of FIG. 3B and shows the mold holder structure on the blow side of the FIG. 1 machine.

Once the parison has been formed at the blank station the split blank mold opens and the neck ring arms swing the parison from its inverted orientation at the blank station to an upright position at the blow station, the blow station including a split blow mold and bottom plate arrangement as shown in FIG. 5 which will permit the parison to be blown to final shape. In accordance with conventional practice the neck ring arms open at the blow side so that the parison is supported at the upper corners of the blow mold as indicated generally at 24 in FIG. 5 with the result that the neck ring arms can return the neck ring mold to the blank side and reclose for forming a further parison even as the first parison is being final formed at the blow station. Finally, the finished ware is taken out of the blow station by a take-out (not shown) for removal off the bottom plate of FIG. 5 and for transfer to a take-away conveyor system (also not shown). The present invention relates to the means for moving the split molds at the blank and blow stations, and the means for cooling these split molds in a unique mold holder arm structure to be described.

Figure 10:
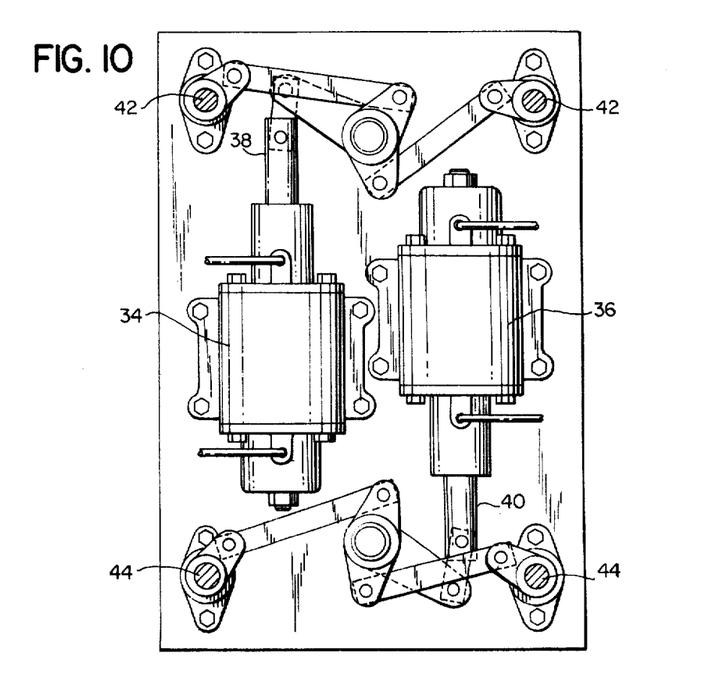
FIG. 10 is a horizontal sectional view taken generally on line 10—10 of FIGS. 2A and 2B, but this view is shown to a slightly reduced scale and illustrates in plan view the Hartford I. S. machine's conventional linkage and air motors for oscillating the lower ends of the vertical rock shafts depicted in FIG. 1.

As mentioned previously a conventional funnel is mounted on the base or platform provided therefore at the blank side of the machine and illustrated by reference numeral 26 in FIG. 1A. A conventional baffle is also provided, and the platform or base therefore is also illustrated in FIG. 1A by reference numeral 28. At the blow side or station of the machine a conventional final blowing head is provided on a suitable platform structure, indicated generally at 30, in FIG. 1B, and the take out structure is conventionally provided on its associated platform as indicated generally at reference numeral 32 in FIG. 1B. Still with reference to the conventional components utilized in a machine section equipped with the present invention, FIG. 10 illustrates in plan view the blow and blank mold operating air motors 34 and 36 respectively.

These motors or pneumatic cylinders have movable portions, 38 and 40 respectively, which are conventionally connected through a suitable linkage to oscillate associated pairs of vertical rock shafts 42, 42 and 44, 44 located, respectively, at the blow and the blank sides of the machine section. These shafts appear in FIGS. 1B and 1A respectively and will be discussed in greater detail with reference to the associated toggle links for achieving the mold opening and closing movement. Still with reference to FIG. 10 the linkage provided between the linearly reciprocal air motor parts 38 and 40, the reader is referred to the above mentioned Ingle U.S. Pat. No. 1,911,119 for a more detailed description of this linkage. Basically, such linkage provides for the opposite but equal angular displacement of each of the rock shafts associated with each of the two machine stations depicted in FIGS. 1A and 1B. It should be noted, however, that one important feature of the present invention resides in the fact that this conventional linkage is adapted for use in achieving the in-line motion to be described, and that the vertically extending rock shafts associated with the conventional linkage are also adapted for use in achieving this in-line mold motion for purposes of modifying a conventional Hartford I. S. type glassware forming machine section with a minimum of structural changes or modifications.

Figure 2:
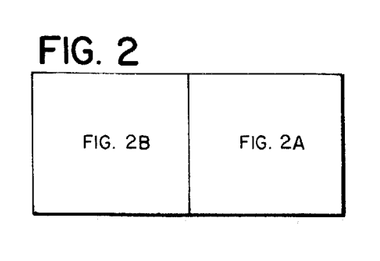
FIG. 2 is a vertical sectional view taken generally on the line 2A—2A and 2B—2B of FIGS. 1A and 1B respectively. This view is also a composite view and illustrates in vertical section the blank and blow sides, respectively, of a typical Hartford I. S. type machine modified in accordance with the present invention.
Figure 2A:
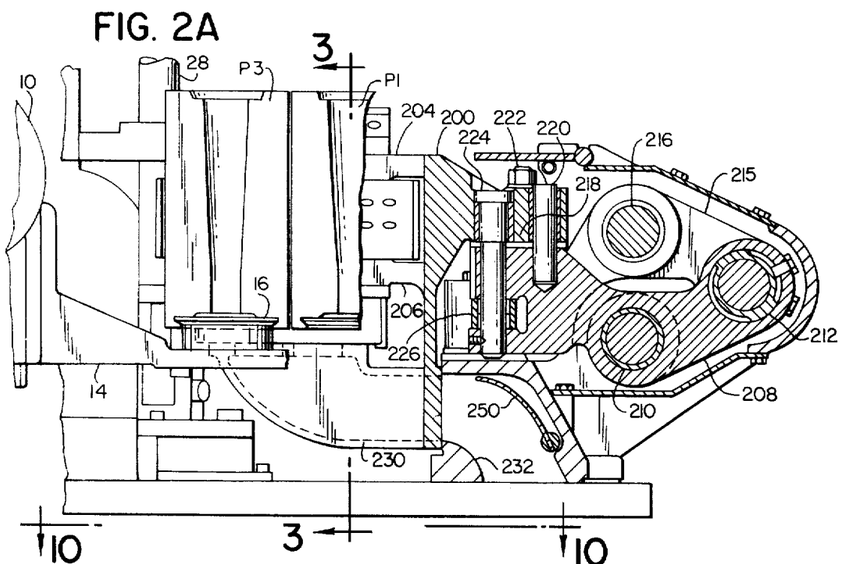
Figure 2B:
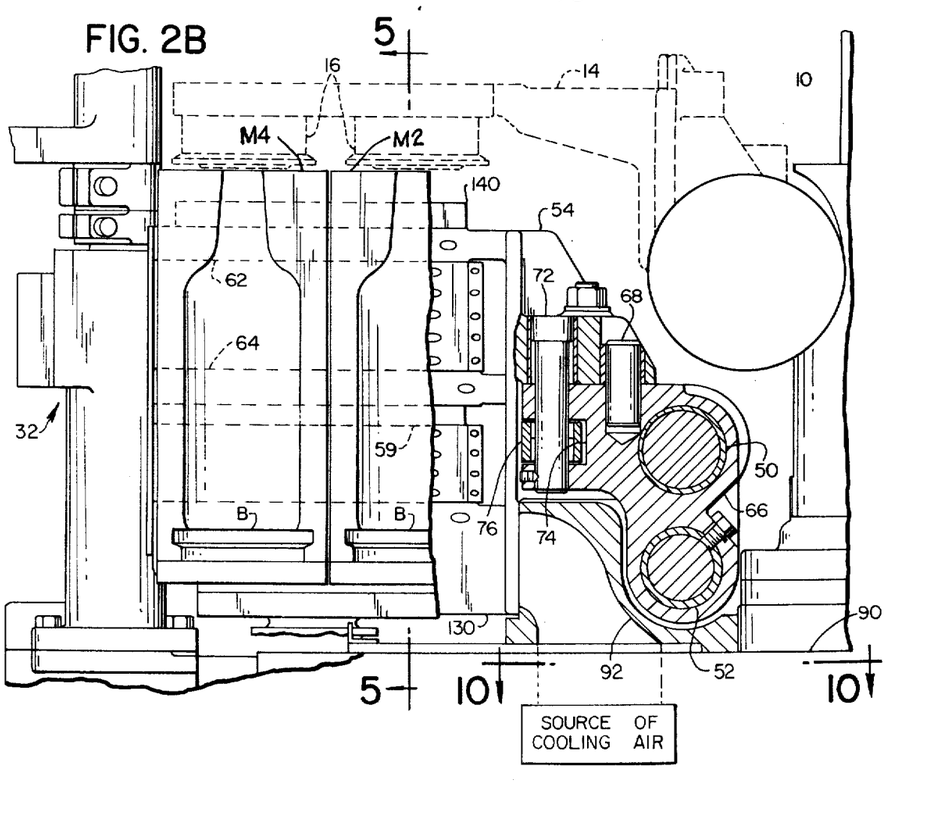

In accordance with the present invention, and referring for convenience first to the blow side of the machine as illustrated in FIGS. 1B and 2B, a pair of fixed horizontally extending guide rods or ways 50 and 52 are provided immediately below the neck ring hub mechanism 10. These guide rods 50 and 52 are oriented normal to the path of movement of the parisons as they are transferred between the blank and the blow stations by the neck ring arms 12 and 14. More particularly, the neck ring molds 16, 16 which support the parisons during transfer movement in a vertical plane about the axis of the neck ring hub mechanism 10, and the guide rods 50 and 52 are horizontally arranged immediately below the neck ring hub mechanism 10 achieving a saving in space at the blow station attributable to the lack of any requirement for a vertically disposed hinge pin as taught for example in the above mentioned patent to Ingle U.S. Pat. No. 1,911,119. Mold holder structure or means is slidably received on the fixed guide rods 50 and 52, and such structure carries the split blow mold segments thereon so that these mold segments M1, M2, M3 and M4 are adapted to move parallel to the fixed ways toward and away from one another from the open positions depicted in FIG. 1B to closed positions where the mold segments M1 and M2 mate with one another to define the mold cavity shown in FIG. 2B.

The mold holder structure more specifically comprises outer or cantilevered portions 54 and 56, which portions comprise upper and lower mold holder arms, and these arms in turn support upper and lower mold holder insert plates, 58 and 60, respectively, which plates in turn support the blow mold halves or segments. FIG. 2B shows the upper and lower mold holder arms at, 62 and 64, respectively, and also shows the upper and lower mold holder insert plates associated with the arms at, 58 and 59, respectively, It should perhaps be noted that the left and right hand mold holder structures are identical except for the fact that each is a mirror image of the other, and therefore only the left hand mold holder structure 54 will be described in detail herein.

The left hand mold holder structure not only includes the outer portion 54, but also includes an inner bracket portion 66 which is slidably received on the parallel horizontally extending guide rails or ways 50 and 52. The inner portion 66 is rigidly secured to the inner end portion of the cantilevered outer portion 54 of the left hand mold holder arm structure by a pin 68, threaded fasteners 70, 70 and a pivot pin 72. The pivot pin 72 extends downwardly across a slot 74 defined by a bifurcated portion of the bracket 66. Thus, the pivot pin 72 provides a bearing for toggle link 76, which link 76 is pivotally connected by pin 78 to a crank arm 80 provided for this purpose at the upper end of the rock shaft 42. It will be apparent, therefore, that oscillating the rock shaft 42 served to slide the left hand mold holder arm structure from the position shown in FIG. 1B, to a position for closing the mold halves P1 and P2 on one another in response to a timed pneumatic signal similar to that utilized in a conventional Hartford I. S. type machine, with its pivotally mounted mold holder arms.

Figure 9:
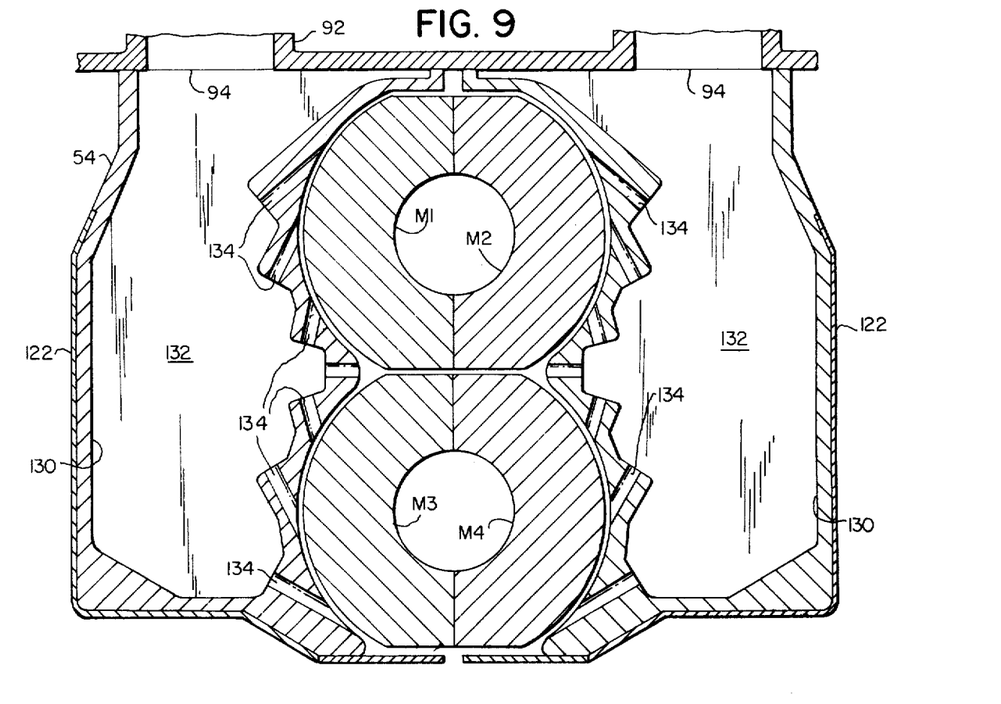
FIG. 9 is a horizontal sectional view taken generally on line 9—9 of FIG. 5 and also illustrates the vertical interface between the movable mold holder structures and the fixed frame of the machine at the blow side.

In the fixed frame of the machine, and more particularly in the bed 90, a fixed bracket 92 defines a passageway for connecting a cooling air source with the machine's fixed structure to an internal chamber defined in each of the mold holder means or structures. This cooling air source is depicted schematically in FIG. 2B, and in this view, an outlet opening 94 for the passageway is defined by the bracket 92. The opening 94 is arranged in a plane parallel the direction of motion of the mold holder structures. Actually, two such outlet openings are provided as best shown in FIG. 9, one opening being associated with the left hand mold holder structure and the other opening being associated with the right hand mold holder structure. FIG. 9 also shows the mold holder structures in their closed position and in this view it will be apparent that cooling air is continuously available to the internal chamber defined in the mold holder structures, not only when the molds are closed as shown in FIG. 9, but also when the molds are opened as depicted in FIG. 1B, this as a result of the relative sizes of the openings associated with the fixed structure and the inlet opening associated with the mold holder structures. More particularly, in FIG. 9 the latter opening is considerably larger than the former with the result that cooling air is continuously available to the molds under substantially the same conditions of air flow as the molds are moved from and to their limit positions, with the result that the temperature of the forming surface of the mold can be more closely controlled than has been possible heretofore with cooling wind towers, or the like.

Turning next to a more detailed description of the mold holder structure itself, and referring more particularly to the vertical sectional view indicated generally by the line 5—5 of FIG. 2B, the mold holder structures are shown in a position for forming the article of glassware, that is, with the split mold segments M1 and M2 closed about the bottom plate B. Each of these mold holder structures includes an upper and a lower mold holder arm, 62 and 64 respectively, which are rigidly secured to one another at the inner ends, and at the juncture between the bracket 66 and the mold holder structure itself as best shown in FIG. 2B. In order to adapt the mold holder arms for supporting molds of various sizes and shapes, mold holder insert plates 58 and 59 are mounted thereto and these plates are pivotally mounted to associated mold holder arms for limited pivotal movement in a horizontal plane so as to assure that the molds mate properly with one another during the forming of the articles of glassware in a double gob configuration such as shown in the drawings.

A pivot pin for the upper insert plate is indicated generally at 100 in FIG. 1B and smaller pins 102 and 104 are snugly received in the insert plates, but loosely received in the mold holder arms, so as to permit limited pivotal movement of the insert plates with respect to the arms for this purpose. Still with reference to the insert plates 58 and 59, the mold halves or segments can be seen to be hung on these insert plates in accordance with conventional practice as a result of the notches provided in such plates and as a result of flanges provided for this purpose on the molds themselves. The insert plates on the mold holder arms, and this particular manner of mounting the molds thereto, is old in the art and need not be described in detail. Further, in FIG. 5, the pivot pin 100 and associated angular travel limiting pins 102 and 104 have been omitted from this view for clarity.

In accordance with the present invention the left and right hand mold holder structures define internal chambers each of which chambers has an inlet opening in continuous slidable communication with the opening 94 described above. The internal chamber provided in each of the mold holder structures is more particularly defined by a middle or center chamber defining segment 110 located between the upper and lower mold holder arms 62 and 64 respectively and illustrated to best advantage in FIG. 6. This view also shows the lower mold holder arm in relationship to the middle chamber defining segment 110. The segment 110 defines a portion of the chamber in the mold holder structure, and also defines nozzle openings 112 and 114 for delivering cooling air to the various external areas of the mold segments M2 and M4.

Figure 6:
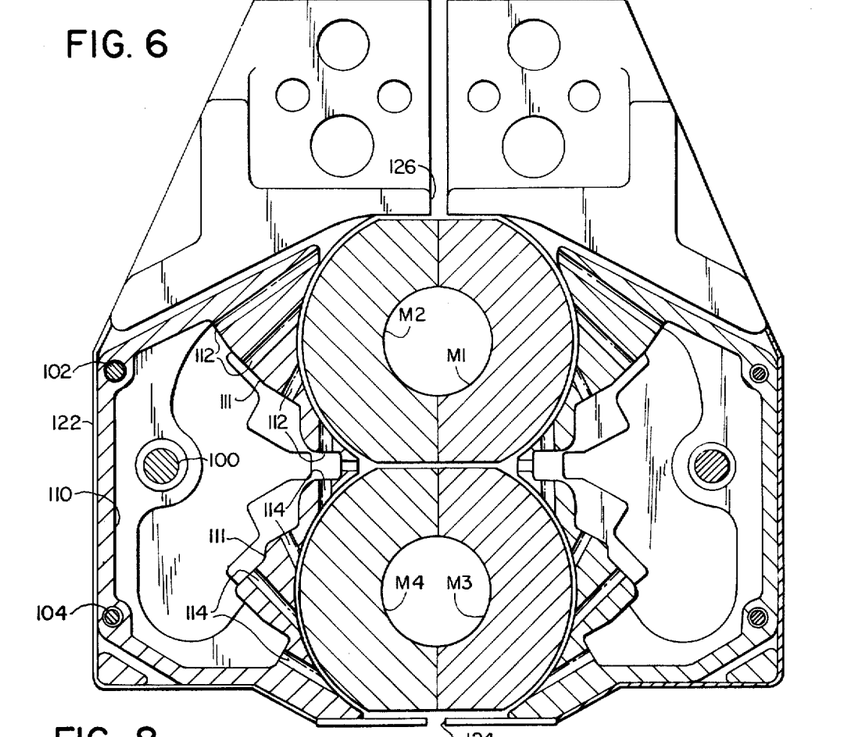
FIG. 6 is a horizontal sectional view taken generally on line 6—6 of FIG. 5.

These nozzle openings 112 and 114 are defined by a thickened inner wall portion 111 of the chamber defining segment 110, and these nozzle openings 112 and 114 are preferably designed to establish a generally horizontal flow pattern around each of the two generally cylindrical molds M1, M2 and M3, M4 respectively. More particularly, the nozzle openings 112, 112 associated with split inner molds M1, M2 are not only arranged horizontally, but they are also arranged generally tangentially with respect to the exterior mold surface in order to create a circulatory flow pattern such that the cooling air flows through the nozzle openings 112 and 114 around the molds M2 and M4 respectively, and vented to atmosphere at vertically elongated slots, 126 and 124 respectively. The inner slot 126 is defined by the segment 110 and the outer slot 124 by a sheet metal plate member 122 to be described.

FIG. 6 also shows the pivot pin 100 for pivotally supporting the mold holder insert plate 59 on the mold holder are 64. The angular freedom of these insert plates to move with respect to their associated arms is facilitated by providing enlarged openings in the segment 110 not only for the pins 102 and 104 but also for the pin 100. Further, the material presently preferred for fabricating the chamber defining insert 110 is aluminum but other readily cast material might be used for this chamber defining insert 110. A spacer 111 as shown in FIG. 5 may be provided at the upper interface of the chamber defining segment 110 and the upper mold holder arm 62. The spacer may take the form of a gasket member attached to the chamber defining segment 110.

Figure 7:
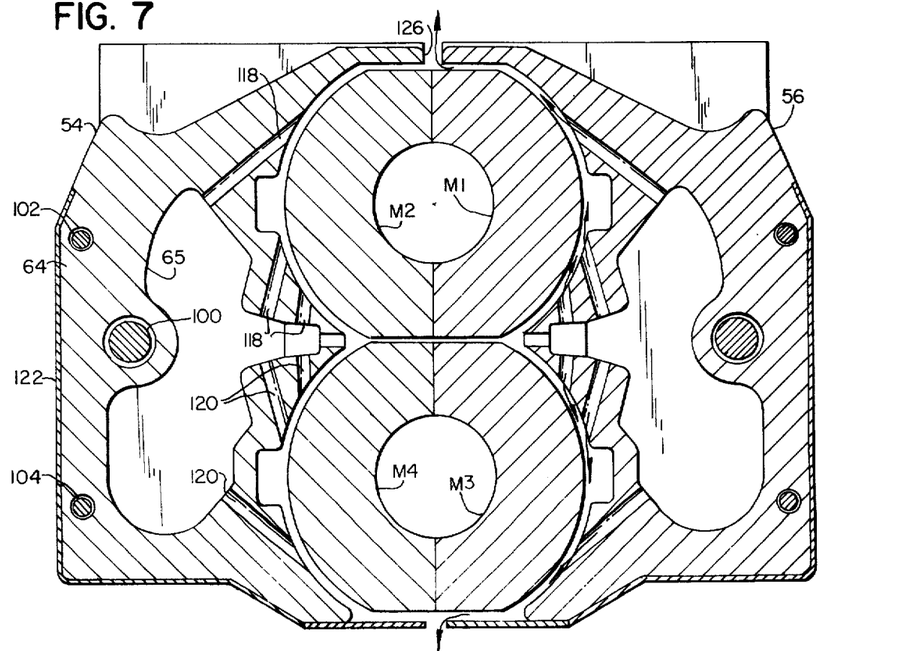
FIG. 7 is a horizontal sectional view taken generally on line 7—7 of FIG. 5.

Still with reference to the right hand mold holder structure and the internal chamber defined therein, FIG. 7 shows the mold holder arms 54 and 56 and more particularly the lower cantilevered portions 64 which define an opening, as indicated generally at 65, to provide communication between the interior of the above-described middle chamber defining segment 110, and the interior of the lower chamber defining segment 116. As shown in FIG. 7 the mold holder arm 64 preferably includes nozzle defining passageways 118, 118 for cooling the adjacent external surfaces of the mold M2, and also nozzle openings 120, 120 for cooling other adjacent portions of the mold segment M4. These nozzle openings 118 and 120, like those described previously with reference to the segment 110 of FIG. 6, are so constructed and arranged that a horizontally stratified circulatory air flow pattern is created around the mold segments M2 and M4. The arrows shown in FIG. 7 illustrate tangential direction of the flow lines in this flow pattern. A bent sheet metal plate member 122 is secured to the external surfaces of the lower mold holder arm 64 and also to the external surface of the other mold holder arm 62, and the outer end portion 124 of said plate member 122 terminates just short of the parting line for the mold halves M3 and M4 such that the cooling air passing through the nozzles 120 will be vented to atmosphere at this point. At the inner corners of the mold holder arms as indicated at 126 in FIG. 7 the air is vented from nozzles 118, 118. The left hand mold holder structure is similar, and need not be described in detail.

Figure 8:
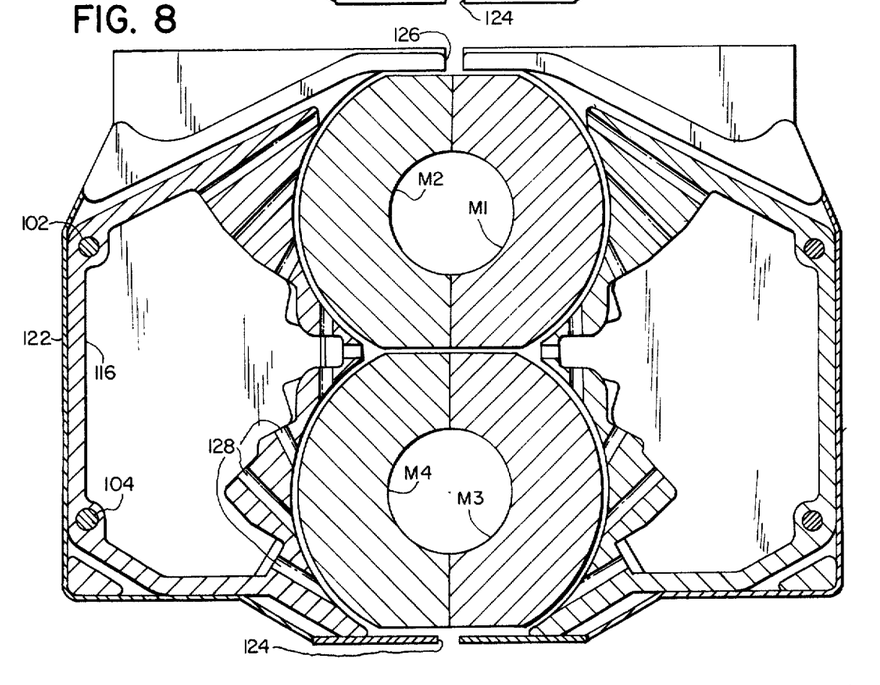
FIG. 8 is a horizontal sectional view taken generally on line 8—8 of FIG. 5.

The lower chamber defining segment 116 is best shown in the horizontal sectional view of FIG. 8, and this segment 116 like the segment 110 appearing in FIG. 6, is preferably cast from aluminum, being substantially hollow, and defining nozzle openings 128, 128 for cooling the adjacent mold segments M2 and M4. Here again, the desired horizontally stratified circulatory air flow pattern is achieved as a result of these generally tangential nozzle openings 128, 128. Finally, a lower collector portion of the chamber defining structure within the mold holder means is illustrated to best advantage in FIG. 9. This lower collector portion actually defines the inlet opening 94 for the chamber as mentioned previously, and is held to the other chamber defining sections 110 and 116 as a result of the bent sheet metal plate 122. The collector portion shown in FIG. 9, together with the lower chamber defining segment 116, comprises a lower chamber defining structure which is supported from the lower mold holder arm 64 and insert plate 59. This lower chamber defining structure defines the inlet opening referred to above for conveying cooling air under pressure to the interior mold holder structure itself. The lowermost segment 130 includes a bottom wall 132 and also defines air passageways or nozzles 134, 134 which nozzles provide cooling air to the lower portion of the mold halves M1 and M3, and in addition serve to cool the bottom plate B as best shown in FIG. 5.

It should perhaps be noted that an upper chamber defining segment 140 can also be conveniently provided above the upper mold holder arm in the event that narrow neck glassware is to be formed, that is in the event that the molds M1 and M3 extend upwardly a significant distance above the upper mold holder arm 62. Such a chamber defining segment 140 is illustrated in FIG. 5 and includes nozzles 142, 142 but no sectional view is provided for this chamber defining segment because of the fact that it would be substantially similar to those chamber defining segments depicted in FIGS. 6 and 8 for example.

Turning next to a description of the improved in-line mold motion structure associated with the blank side or station of the machine, and as illustrated in FIGS. 1A and 2A, a double gob set of blank or parison molds are depicted in the open position in FIG. 1A at P1, P2, P3 and P4 such that these mold segments can be closed upon one another as a result of in-line motion of the associated mold holder structure to be described, with the result that these mold segments close around the neck ring mold 16 as shown in FIG. 2A defining upwardly open cavities for receiving gobs of molten glass from the gob distribution system mentioned previously. As in the blow side of the machine, left and right hand mold holder structures are provided in the form of cantilevered means, 200 and 202 respectively, each such mold holder structure including an upper and a lower mold holder arm, 204 and 206 respectively, each of which is connected at its inner of right hand end as viewed in FIG. 2A to the end of a bracket portion of the mold holder structure. More particularly the left hand mold holder structure 200 is attached to a bracket 208 slidably received on fixed guide rods 210 and 212. These rods or ways are mounted in the fixed frame of the machine, and more specifically to a U-shaped bracket indicated generally at 214 in FIG. 1A.

The right hand mold holder arm 202 is attached to a bracket 215, which bracket 215 is slidably supported on the shaft 212 and on a third shaft 216 located immediately above the shaft 210 associated with the left hand mold holder structure. The three guide rods 210, 212 and 216 are arranged in triangular pattern, as best shown in FIG. 2A, the rod 212 serving to support both brackets 208 and 215. Because this guide rod 212 is spaced horizontally from the two rods 210 and 216 which also support the brackets, 208 and 215 respectively, the horizontally cantilevered mold holder structures can react higher forces than has been possible heretofore with a single vertical hinge pin. FIG. 1A shows both these brackets 208 and 215, each such bracket includes an elongated portion such as that shown at 218 associated with the bracket 215 extending horizontally between the spaced rods 210 and 212. This construction and arrangement assures that both mold holder arm structures will not exhibit any tendency to deflect as the molds close against one another. This construction thus provides for increased closing forces over those possible with the prior art vertical hinge pin arrangement for supporting the mold holder arms in a conventional Hartford I. S. type glassware forming machine.

Each of the brackets 208 and 215 includes a projecting portion which defines a suitable land 218 for receiving the inner end portion of the associated mold holder structures, 200 and 202. As on the blow side of the machine section, the left and right blank mold holder structures are attached to their associated brackets by means of a dowel pin 220, a pair of threaded fasteners 222, 222 and a pivot pin 224. The latter pin 224 extends downwardly through an opening defined by the bifurcated projecting portion of the bracket 208 to pivotally receive a toggle link 226. The toggle link 226 has a free end portion, best shown in FIG. 1A, which is pivotally mounted to a crank arm 228 provided for this purpose on the upper end of the rock shaft 44. As so constructed and arranged oscillation of the shafts 44, 44 produces equal but opposite translational movements of the mold holder arm structures 200 and 202 toward and away from one another in response to actuation of the fluid motor 34 described hereinabove with reference to FIG. 10.

As in the blow mold supporting structure described hereinabove the blank mold supporting structure also includes a generally vertically extending interface between its lower movable collector portion, indicated generally at 230 in FIG. 2A, which portion 230 cooperates with the outlet defining fixed structure defining the passageway 232 to provide communication between the source of cooling air within the machine section and the inlet opening defined in the structure indicated generally at 230. While this interface is depicted as being vertical, it is important to note that such interface need only be parallel to the direction defined by the fixed ways or guide rods 210, 212 and 216. Still with reference to this interface between the movable mold structure the fixed machine frame, FIG. 1A illustrates the fixed outlet opening defining structure 232 and also illustrates the inlet opening associated with the mold holder structure 230. As in the mold holding structure associated with the blow mold side of the machine, the opening defined within the movable structure is considerably larger than that defined in the fixed structure of the machine frame such that air for cooling purposes is continuously available to chambers defined internally of both blank mold holder structures 200 and 202.

Figure 3:
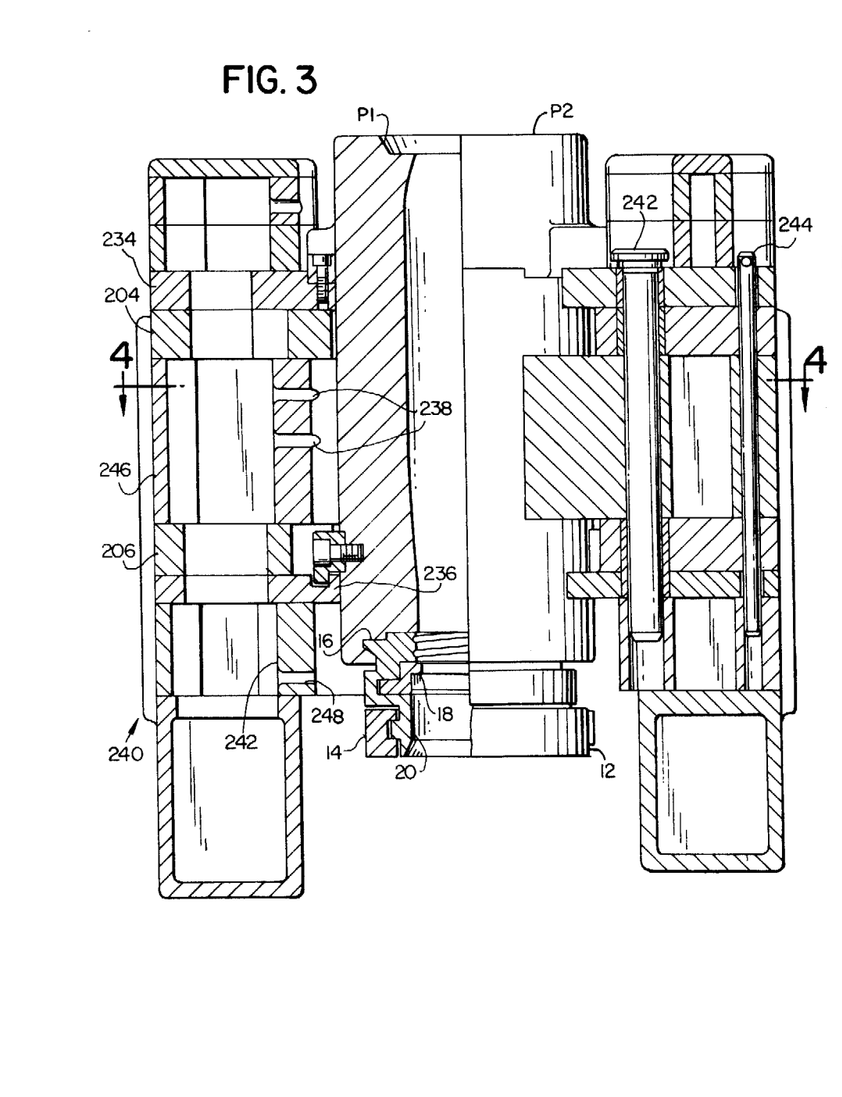
FIG. 3 is a vertical sectional view taken generally on the line 3—3 of FIG. 2A and shows the mold holder structure on the blank side of the FIG. 1 machine.

Turning next to a more detailed description of the left hand blank mold holder structure 200, FIG. 3 shows the parison mold segments P1 and P2 mounted to the movable mold holder structure and more particularly to upper and lower insert plates 234 and 236 carried respectively by the upper and lower mold holder arms 204 and 206. As in the mold holder structure associated with the blow side of the machine, these arms and inserts define openings therethrough, and are vertically spaced from one another such that an intermediate chamber defining segment 246 can be inserted between the upper and lower mold holder arms. This chamber defining segment 246 is illustrated in horizontal section in FIG. 4 in some detail. The openings in the mold holder arm 206 are indicated generally at 206a and 206b in this view, and the cross sectional configuration of the chamber defining segment 246 is seen to define a plurality of nozzle openings or pasageways as indicated generally at 238, 238 such that a flow of cooling air is continuously available to the exterior of the mold segments P1 and P3, not only when the molds are closed, but continuously during mold holder arm movement.

As in the mold holder structure described above with reference to the blow side of the machine, a lower chamber defining structure is provided below the lower mold holder arm, on the blank side, such structure being indicated generally at 240 in FIG. 3, comprises a chamber defining structure 242 which includes nozzle openings as indicated at 248 for cooling the lower end of the blank mold and also for cooling the neck ring molds 16, 16. The lower, or collector portion of the structure 240, is indicated at 230 and defines the opening mentioned previously. The said opening has a dimension in the direction of movement of the mold holder arms such that a substantial opening is continuously available during mold holder arm movement for cooling of the molds. Although not shown in FIG. 2A, a cooling air source is also provided at the blank side of the machine frame similar to that described previously with reference to the blow side of the machine frame, and as depicted in FIG. 2B.

Figure 4:
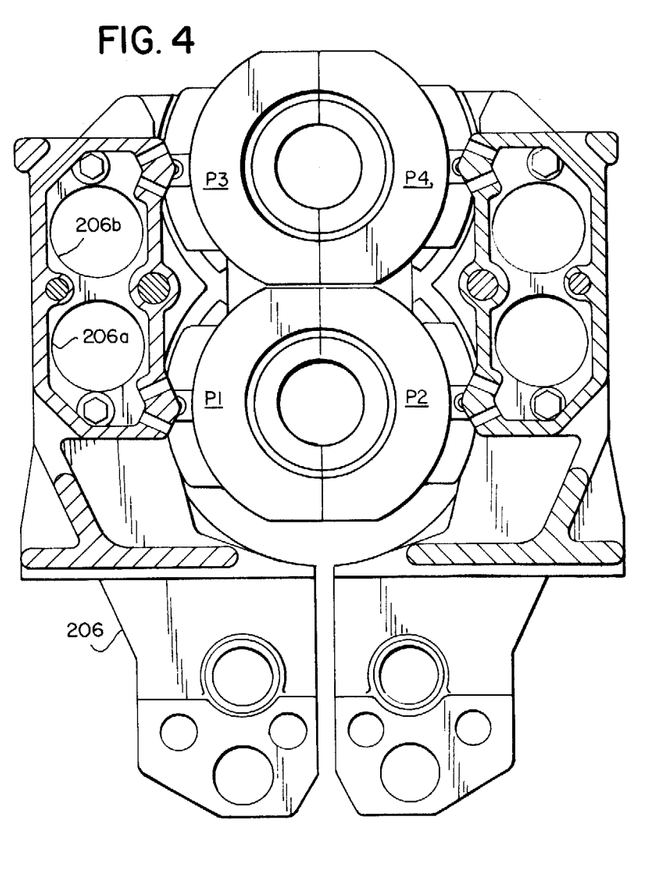
FIG. 4 is a horizontal sectional view taken generally on the line 4—4 of FIG. 3.

FIG. 3 also shows the means for mounting the inserts 234 and 236 to their associated mold holder arms, 204 and 206 respectively, in order to provide for the limited angular travel of the insert plates, 234 and 236, as necessary to accommodate slight differences in the mold faces upon closing of the molds. The pivot pin 242 is received in aligned openings in the upper and lower mold holder arms 204 and 206, and pivotally received in openings provided in the insert plates themselves so that the plates, and their associated mold segments, are adapted to pivot at least slightly with respect to the arms as a result of clearance openings in the inserts for the limiting pin 244. Only one such pin is used in each mold holder at the blank mold side of the machine section shown, and FIG. 4 illustrates the relationship between the pin 244, the pivot pin 242, and the chamber defining segment 246. The latter is held in place by these pins in the embodiment shown. Because of the fact that the blank molds do not require as extensive a flow of cooling air as do the blow molds, a damper valve is preferably provided in the passageway defined by the bracket 232. The damper 250 is best shown in FIG. 2A. As a result of the fact that less cooling air is required to the blank molds P1, P3, P2 and P4, FIG. 4 shows that the no sheet metal outer structure is utilized on the blank mold holders. So too, somewhat larger openings are provided between the molds and the segments 246 of FIG. 4 to permit the lower air flow to be vented to atmosphere. At the blow side, on the other hand some shrouding is provided for at the inner and outer ends of the cantilever mounted blow mold holder structures.

Although the drawings show a mold cooling system which is especially well adapted for cooling a "double gob" blow mold set-up, it will be apparent that the advantages attaching to the present invention can also be applied to a "triple gob" set-up. The space savings at the blow side of a triple gob I. S. machine section equipped with in-line mold motion are even more pronounced than with the double gob set-up described hereinabove. Less obvious, but just as significant are the advantages to applying the above described mold cooling improvements to a triple gob machine section.

We claim:

1. A glassware forming machine comprising
   a. a blank mold station having blank mold cavity defining structure for receiving the gobs of glass and means for partially forming the gobs into parisons,
   b. partible neck ring mold structures for mating with said blank mold cavity defining structure at said blank station,
   c. a blow mold station horizontally spaced from said blank station in the same plane and having upwardly open blow mold cavity defining structure for receiving the partially formed parisons from said blank station,
   d. transfer means for said parisons including neck ring arms associated with said partible neck ring mold structure and means pivotally supporting said arms for movement about a horizontal axis located between said blank mold and blow mold stations,
   e. means defining fixed horizontally extending ways at least at one of said stations, which ways are oriented parallel to the said axis of pivotal movement for said neck ring arms,
   f. said mold cavity defining structure at said one station including mold holder means movably received on said fixed ways for supporting mold segments thereon for parallel movement toward and away from one another, and
   g. means for moving said mold holder means in synchronism with one another.

2. The combination defined in claim 1 further including a fixed frame for supporting said horizontally extending ways at said one station, said fixed frame defining a plenum with an outlet opening oriented in a plane parallel said ways and adjacent said mold holder means, and at least one chamber defined by said mold holder means, which chamber has an inlet opening in slidable communication with said plenum outlet opening.

3. The combination defined in claim 2 wherein said means for moving said mold holder means comprises a fluid motor, a pair of vertically extending rock shafts, linkage connecting the lower ends of said shafts to said fluid motor for oscillating said shafts through opposite but equal angular displacements, and toggle links connecting the upper ends of said shafts to said mold holder means.

4. The combination defined in claim 2 wherein said fixed ways comprise at least one guide rail adjacent said blow station, and said blow mold holder means including outer portions for supporting blow mold halves and inner bracket portions slidably received on said guide rail for supporting the mold holder means and the associated mold halves or segments.

5. The combination defined in claim 2 wherein said fixed ways comprise at least one guide rail adjacent one of said two stations, and said mold holder means including outer portions for supporting mold halves and inner bracket portions slidably received on said guide rail to support the mold holder means and associated mold halves.

6. The combination defined in claim 4 wherein said blow mold holder means further includes vertically spaced upper and lower mold holder arms supported by said inner bracket portions, said outer portions comprising upper and lower insert plates pivotally mounted to said upper and lower arms respectively, said insert plates associated with each arm supporting at least two blow mold segments or halves.

7. The combination defined in claim 6 wherein each of said mold holder means further includes a middle chamber defining segment between said upper and lower mold holder arms, and a lower chamber defining segment supported from said lower arm and insert, said lower arm and insert having vertical openings therethrough, and said chamber defining segments having nozzle openings to direct cooling fluid from said fixed plenum onto said mold halves.

8. The combination defined in claim 7 wherein said upper mold holder arm and insert have vertical openings, and an upper chamber defining segment carried by said upper arm and insert with nozzle openings adjacent the blow mold halves.

9. The combination defined in claim 2 wherein said fixed ways comprise at least one guide rail adjacent said blank station, and said blank mold holder means including outer portions for supporting blank mold halves and inner bracket portions each of which is slidably received on said guide rail.

10. The combination defined in claim 9 wherein said blank mold holder means further includes vertically spaced upper and lower mold holder arms supported by said inner bracket portions, said outer portions comprising upper and lower insert plates pivotally mounted to said upper and lower arms respectively, said insert plates associated with each arm supporting at least two blank mold segments or halves.

11. The combination defined in claim 10 wherein each of said mold holder means further includes a middle chamber defining segment between said upper and lower mold holder arms, and a lower chamber defining segment supported from said lower arm and insert, said lower arm and insert having vertical openings therethrough, and said chamber defining segments having nozzle openings to direct cooling fluid from said fixed plenum onto said mold halves.

12. The combination defined in claim 11 wherein said upper mold holder arm and insert have vertical openings, and an upper chamber defining segment carried by said upper arm and insert with nozzle openings adjacent the blow mold halves.

13. The combination defined in claim 3 wherein said inlet opening for said chamber in said mold holder means has a width, in the direction of mold holder means movement, so related to the width of said plenum outlet that fluid for cooling the mold segments is continuously available during movement of said molds.

14. The combination defined in claim 13 wherein said fixed ways comprise at least one guide rail adjacent one of said two stations, and said mold holder means including outer portions for supporting mold halves and inner bracket portions slidably received on said guide rail to support the mold holder means and associated mold halves.

15. The combination defined in claim 13 wherein said mold holder means further includes vertically spaced upper and lower mold holder arms, which arms are connected to one another adjacent their inner ends, and said inner bracket portion of each mold holder means being connected to the said inner connected ends of said mold holder arms.

16. The combination defined in claim 15 wherein each of said toggle links has one link pivotally connected to said inner bracket portion adjacent the inner end of an associated mold holder arm.

17. The combination defined in claim 16 wherein each of said mold holder means further includes middle chamber defining segment between said upper and lower mold holder arms, and a lower chamber defining structure supported from said lower arm, said chamber inlet opening defined below said inner ends of said arms in said lower structure.

18. The combination defined in claim 2 wherein said means for moving said mold holder means comprises a motor with a movable and a fixed part, said movable part connected to said mold holder means for moving said mold holder means in synchronism and in equal but opposite directions.

* * * * *